Dec. 1, 1964   E. V. BARR   3,158,883
TAPPING UNIT WITH MEANS TO ADVANCE SPINDLE TO WORK
Filed Aug. 8, 1960   4 Sheets-Sheet 1

INVENTOR.
ELLIS V. BARR
BY
ATTORNEY

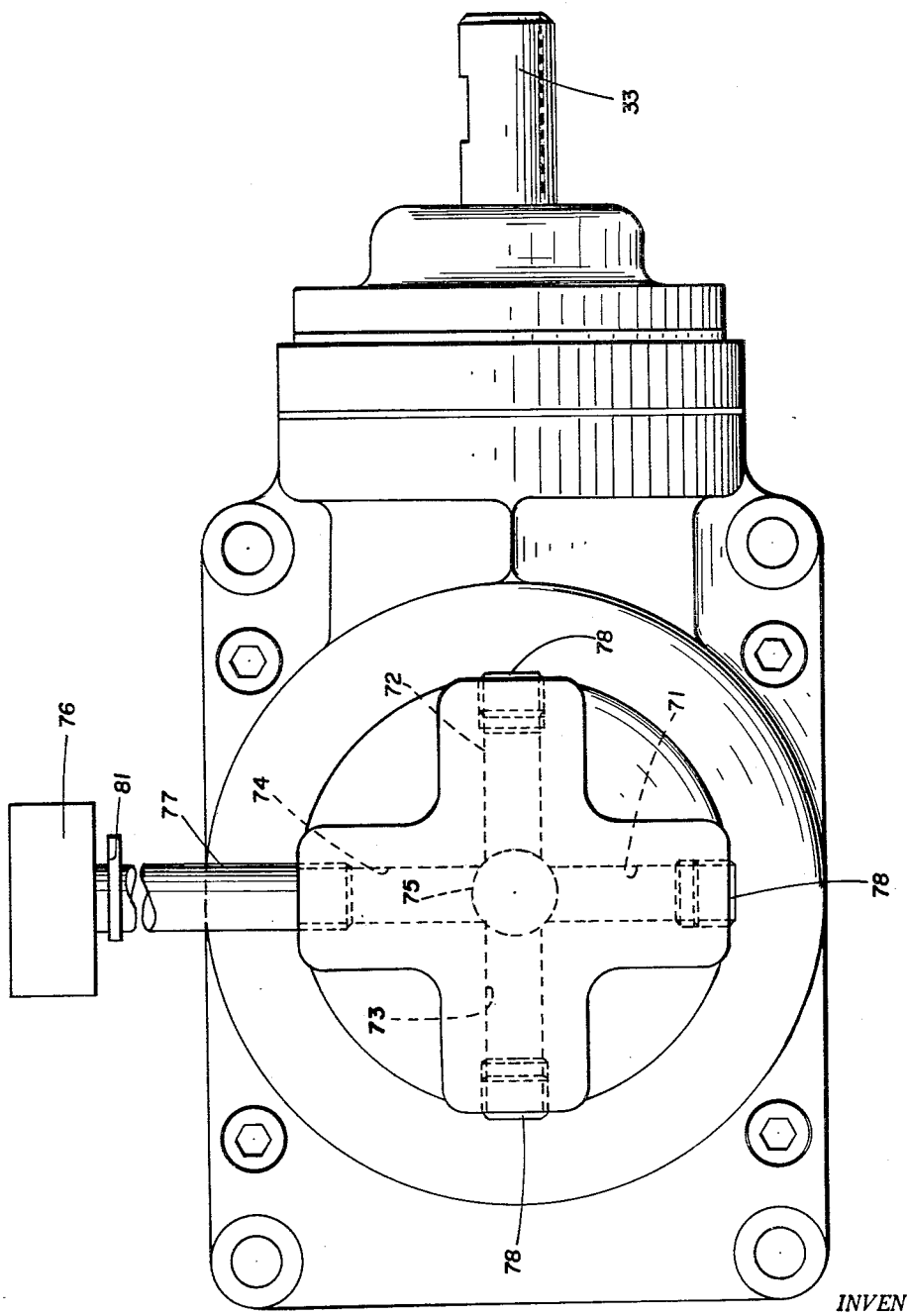
FIG. 2
INVENTOR.
ELLIS V. BARR
BY
ATTORNEY

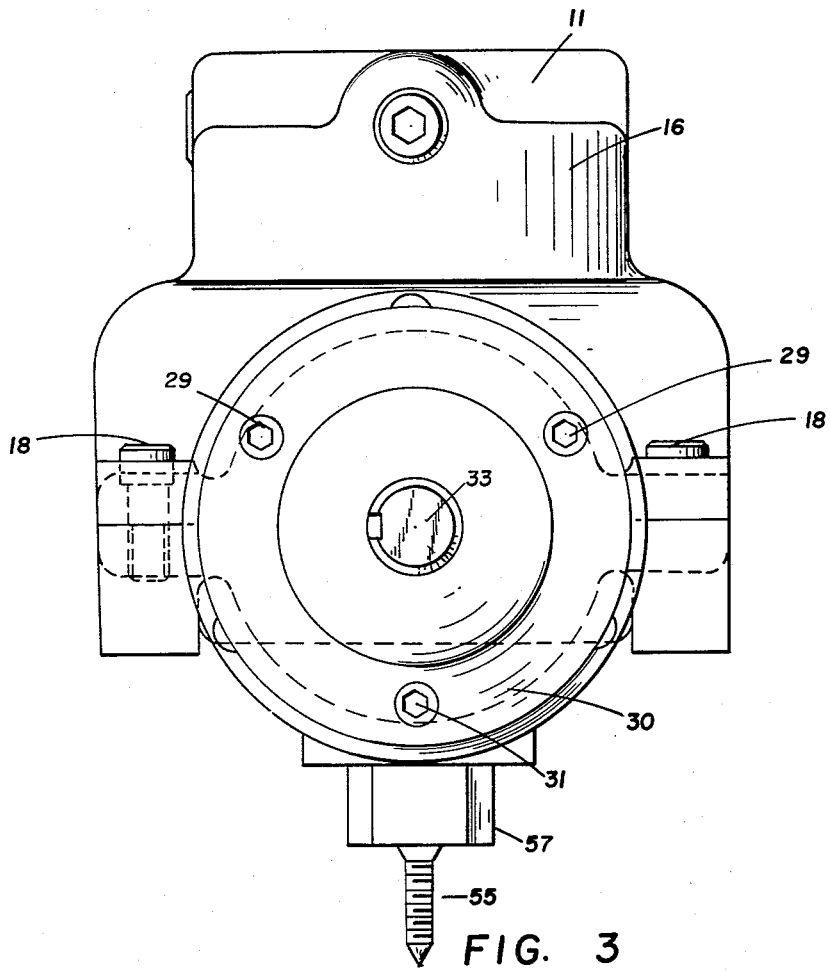
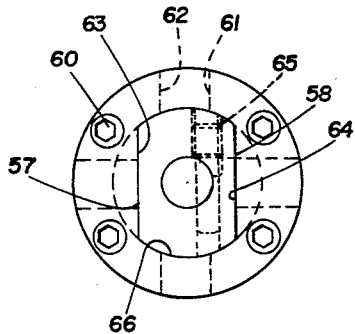
FIG. 3
FIG. 4

3,158,883
TAPPING UNIT WITH MEANS TO ADVANCE
SPINDLE TO WORK
Ellis V. Barr, Dayton, Ohio, assignor to Laughter Corp.,
Dayton, Ohio, a corporation of Ohio
Filed Aug. 8, 1960, Ser. No. 48,266
3 Claims. (Cl. 10—139)

This invention relates to an improved tapping unit, and more particularly, to a novel tapping unit which is automatically operated in the tapping direction to tap an opening in a workpiece and is then automatically moved in the opposite direction after an opening has been tapped.

Generally, this invention provides an improved tapping unit for tapping workpieces and comprises a quill rotatably secured to a suitable housing carrying means for rotating the quill relative to the housing. A tapping spindle is carried by the quill and is adapted to be rotated therewith while being selectively, axially movable relative thereto, the spindle carrying a tap at one end thereof and including means whereby the spindle can be selectively, axially moved relative to the quill while same are rotating in unison to advance the tap into an opening in the workpiece to tap same. Subsequently, the axial movement of the spindle relative to the quill and the direction of rotation are reversed whereby a swage tap is retracted from the tapped opening in the workpiece.

One of the primary objects of this invention is to provide a tapping unit which will tap a hole in a workpiece while being made in a die in such a manner as to eliminate chips.

Another object is to provide such a unit for tapping a hole in a workpiece whereby extra handling of the workpiece is unnecessary.

Another object is to provide such a unit with means for tapping whereby initial pressure can be applied to start the tap and the tapping unit will concomitantly apply a desired lineal pressure so that the tap will advance in its proper lead.

A further object is to provide a relatively small tapping unit which will more effectively and economically perform the desirable workload of conventional units.

Other objects, uses and advantages of this invention will become apparent upon a reading of the following specification, taken in conjunction with the accompanying drawings, wherein:

FIGURE 2 is a top view of the tapping unit illustrated in FIGURE 1;

FIGURE 3 is an end view of the tapping unit illustrated in FIGURE 1;

FIGURE 4 is a bottom view of part of the tapping unit illustrated in FIGURE 1.

Figure 1:
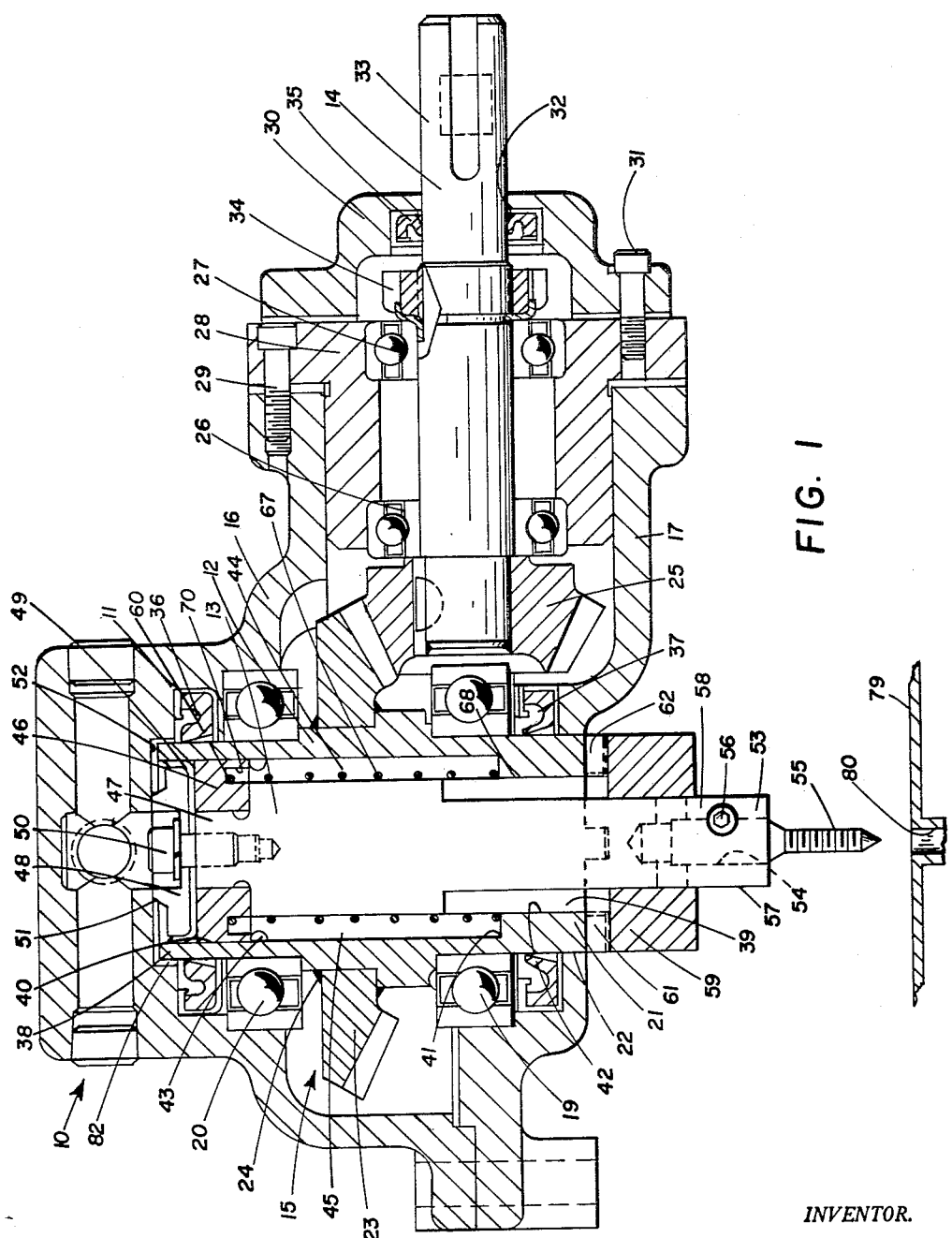
FIGURE 1 is an axial, cross-sectional view of the improved tapping unit of this invention.
Figure 5:
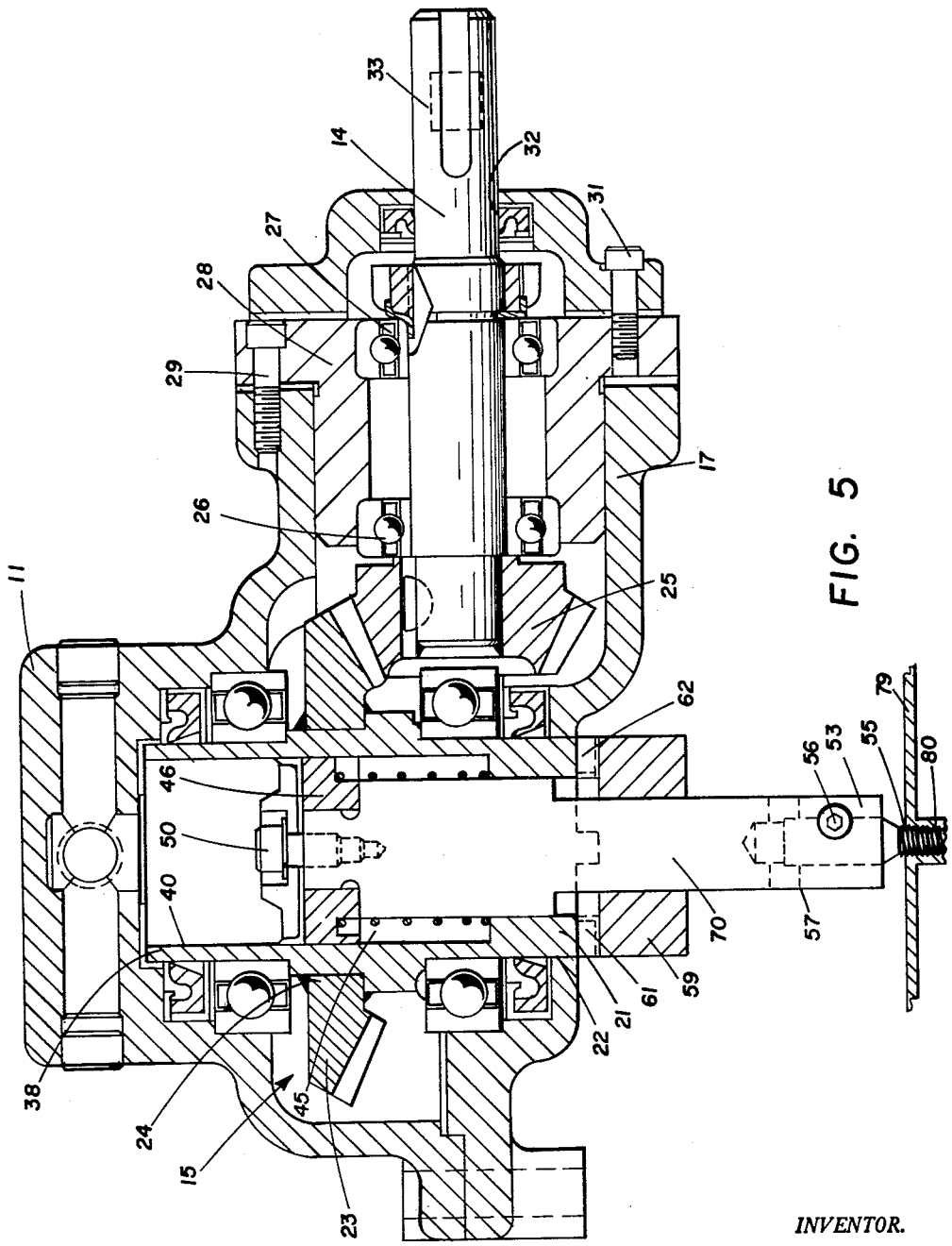
FIGURE 5 is a view similar to FIGURE 1 illustrating the tapping unit in its tapping position.

As illustrated in FIGURE 1, the tapping unit is generally indicated by reference numeral 10 and includes a housing 11 carrying a quill 12, a spindle 13, and an input drive shaft 14 operatively interconnected to quill 12 in a manner hereinafter described.

Housing 11 forms a chamber 15 therein defined by two housing sections 16 and 17 suitably secured together by bolts 18, FIGURE 3.

A pair of suitable bearings 19 and 20 are disposed in chamber 15 of housing 11 and rotatably support the substantially cylindrical quill 12 within housing 11, an end 21 of quill 12 projecting through an opening 22 formed in housing 11.

A beveled gear 23 is secured to the external peripheral surface of quill 12 in any suitable manner, and, in the embodiment illustrated in the drawings, gear 23 is welded to quill 12 at 24.

Beveled gear 23 is disposed in meshing engagement with another beveled gear 25 suitably splined to drive shaft 14 rotatably carried by housing 11 through bearings 26 and 27 and sleeve means 28 secured to housing 11 by bolts 29.

A suitable dust cover 30 is secured to end plate 28 by bolts 31 and has an aperture 32 therein for permitting an end 33 of drive shaft 14 to project from housing 11, the end 33 of drive shaft 14 being adapted to be interconnected to a suitable power source (not shown) in any conventional manner.

A lock nut 34 provides a load on bearings 26 and 27 and seal 35 is provided in dust cover 30 to protect bearings 26 and 27. Similarly, suitable seals 36 and 37 are carried by housing 11 to respectively protect bearings 20 and 19. Seal 36 also eliminates escape of air from chamber 82 in the upper portion of the housing 11.

Quill 12 is respectively provided in its opposed ends 21 and 38 with different size bores 39 and 40 which interconnect with each other to define an annular shoulder 41 within quill 12, bore 39 defining an internal peripheral surface 42 of quill 12 and bore 40 defining another internal peripheral surface 43 of quill 12.

The substantially cylindrical spindle 13 has an external peripheral surface 44 adapted to be disposed in sliding engagement with the internal peripheral surface 42 of quill 12 while being spaced from the internal peripheral surface 43 thereof, the external peripheral surface 44 of spindle 13 defining an annular space 45 with the internal peripheral surface 43 of quill 12.

A suitable piston 46 is carried on a reduced end 47 of spindle 13 and is adapted to be disposed in sliding engagement with internal peripheral surface 43 of quill 12. Piston 46 is secured to the end 47 of spindle 13 by a disc-like member 48 and a leather seal 49 is secured to end 47 of spindle 13 by a threaded member 50. The disc-like member 48 carries a plurality of upwardly extending projections 51 which are adapted to maintain disc-like member 48 spaced from the flat internal peripheral surface 52 of housing 11 in the manner illustrated in FIGURE 1.

The other end 53 of spindle 13 is centrally provided with a bore 54 adapted to telescopically receive a portion of a suitable tap 55, the tap 55 being detachably secured in bore 54 by a transversely disposed dog point set screw 56 as illustrated in FIGURES 1 and 4.

The reduced portion of the spindle 13 is cut away to define a pair of opposed flat parallel sides 57 and 58 as illustrated in FIGURES 1 and 4.

A collar 59 is secured to the end 21 of quill 12 by suitable bolts 60, FIGURE 4, and is also splined thereto by having a plurality of radially disposed projections 61 thereof received in complimentary notches 62 formed in the end 21 of quill 12. Collar 59 is, in turn, splined to the end 53 of spindle 13 by having a pair of flat internal sides 63 and 64 thereof disposed in sliding engagement with flat sides 57 and 58 of spindle 13 and a pair of internal concave sides 65 and 66 disposed in sliding engagement with external peripheral surface 44 of spindle 13 in the manner illustrated in FIGURE 4.

Thus, collar 59 permits quill 12 to rotate spindle 13 in unison therewith while still permitting spindle 13 to be moved axially relative to quill 12 in a manner hereinafter described.

In order to maintain spindle 13 in a predetermined axial position relative to quill 12, a suitable compression spring 67 is disposed in annular space 45 and has one end 68 thereof disposed in engagement with annular shoulder 41 of quill 12 and another end 69 thereof received within an annular recess 70 formed in piston 46 whereby compression spring 67 tends to maintain spindle 13 in the non-tapping position illustrated in FIGURE 1.

Housing 11 is provided with a plurality of radially disposed bores 71, 72, 73 and 74, as shown in FIGURE 2, each bore being adapted to interconnect the external peripheral surface of housing 11 with a transversely disposed central bore 75 leading to piston arrangements 46, 48 and 49 of spindle 13. Each of the bores 71, 72, 73 and 74 is adapted to be interconnected to a fluid pressure source 76 by any suitable means, and, in the embodiment illustrated in the drawings, bore 74 is interconnected to fluid pressure source 76 by a suitable conduit 77, the other bores 71–73 being closed off by suitable plugs 78.

The operation of the tapping unit 10 will now be described.

A suitable workpiece 79 having a pierced or extruded aperture 80 formed therein is advanced by suitable means (not shown) directly beneath tap 55 of tapping unit 10.

When it is desired to tap aperture 80, drive shaft 14 is rotated in the proper direction for driving tap 55 in the tapping direction through beveled gears 25, 23, quill 12 and collar 59 in the manner previously described.

Subsequently, fluid pressure from source 76 is directed against piston arrangement 46, 48 and 49 by opening valve 81 in any suitable manner whereby fluid pressure causes the rotating spindle 13 to be moved axially downwardly relative to quill 12 is opposition to the force of spring 67 whereby tap 55 enters aperture 80 and begins to tap the same. The threading on tap 55 is so constructed and arranged that the rotating tap 55 substantially takes over axial movement of spindle 13 from fluid pressure source 76 and continues to move spindle 13 axially relative to quill 12 until tap 55 has been passed through aperture 80 and actuates a suitable switch (not shown) which reverses the direction of rotation of drive shaft 14 and closes valve 81 whereby tap 55 is rotated in the reverse direction to drive same from aperture 80. Since pressure source 76 is disconnected from the piston arrangement 46, 48 and 49 by valve 81, the spring 67 returns spindle 13 to the position illustrated in FIGURE 1 after tap 55 has cleared aperture 80.

In this manner, it can be seen that tapping unit 10 is adapted to tap an article 79 and then be returned to the position illustrated in FIGURE 1 whereby another article 79 can be advanced into position to be tapped in the same manner.

While tapping unit 10 has been illustrated as being operated by itself, it is to be understood that this unit can be utilized with a punch press operation whereby articles to be tapped by tapping unit 10 can be simultaneously pierced and punched by the punch press while the tapping unit taps the same as they are advanced to tapping unit 10.

Further, axial movement of spindle 13 relative to quill 12 can be effected by utilizing a cam, rack and pinion, electrical means, and the like, instead of fluid pressure as desired.

While the foregoing presents preferred embodiments of the present invention, it is obvious that other modifications and/or equivalents may be employed without departing from the scope of the invention, which is defined in the appended claims.

What is claimed is:

1. A tapping unit comprising a housing, a quill rotatably carried by said housing, said quill having a pair of interconnecting bores formed therein, one of said bores defining a first internal peripheral surface of said quill and the other of said bores defining a second internal peripheral surface of said quill, said bores defining an annular shoulder therebetween, a spindle having a portion thereof disposed in said bores of said quill and having a pair of opposed ends, a tap carried by one of said ends of said spindle, a piston carried by the other end of said spindle, said piston being disposed in engagement with said second internal peripheral surface of said quill, a spring disposed between said piston and said shoulder to tend to maintain said spindle in a first axial position relative to said quill, means to rotate said quill, means to operatively interconnect said quill with said spindle to cause said spindle to rotate in unison with said quill, and means to move said spindle axially relative to said quill in opposition to said spring to move said tap away from said housing.

2. A tapping unit as set forth in claim 1 wherein said last-named means includes fluid acting under pressure against one side of said piston.

3. A tapping unit as set forth in claim 1 wherein said spindle has an external peripheral surface disposed in sliding engagement with said first internal peripheral surface of said quill.

References Cited in the file of this patent

UNITED STATES PATENTS

| | | |
|---|---|---|
| 1,434,564 | Ruetschi | Nov. 7, 1922 |
| 2,338,821 | Raetsch | Jan. 11, 1944 |
| 2,500,540 | Graves | Mar. 14, 1950 |
| 2,836,996 | Bissey | June 3, 1958 |
| 2,863,160 | Ovshinsky | Dec. 9, 1958 |